United States Patent [19]

Eschenburg

[11] Patent Number: 4,602,924

[45] Date of Patent: Jul. 29, 1986

[54] CENTRIFUGAL SEPARATOR

[75] Inventor: Jochim Eschenburg, Friedrichsdorf, Fed. Rep. of Germany

[73] Assignee: Metallgesellschaft Aktiengesellschaft, Frankfurt, Fed. Rep. of Germany

[21] Appl. No.: 665,628

[22] Filed: Oct. 29, 1984

[30] Foreign Application Priority Data

Oct. 28, 1983 [DE] Fed. Rep. of Germany ....... 3339063

[51] Int. Cl.[4] .............................................. B01D 45/12

[52] U.S. Cl. ........................................ 55/345; 55/269; 55/459 R; 55/462; 209/144; 165/8

[58] Field of Search ................. 55/337, 345, 447, 448, 55/269, 462, 267, 346, 347, 459 R; 209/144, 148; 165/8, 119

[56] References Cited

U.S. PATENT DOCUMENTS

| | | | |
|---|---|---|---|
| 2,802,280 | 8/1957 | Sylvest | 55/345 X |
| 3,483,973 | 12/1969 | Jager | 209/144 |
| 3,643,800 | 2/1972 | Mansson | 209/144 |
| 3,670,886 | 6/1972 | Hosokawa et al. | 209/144 |
| 3,724,176 | 4/1973 | Vishnevsky et al. | 55/269 |

FOREIGN PATENT DOCUMENTS 411536 11/1966 Switzerland .

*Primary Examiner*—Charles Hart
*Attorney, Agent, or Firm*—Karl F. Ross; Herbert Dubno

[57] ABSTRACT

A separator for collecting solid particles from a gas stream by centrifugal force comprises a vertical cylindrical housing having a coaxial top gas discharge pipe, a lower gas supply line extending coaxially into the housing, and a solids outlet which is laterally disposed in the lower portion of the housing. That separator has its gas supply line closed at its upper end and merging into at least one duct by which a vertically rising gas stream is deflected into a substantially horizontal direction that is tangential to the gas supply line.

11 Claims, 10 Drawing Figures

CENTRIFUGAL SEPARATOR

FIELD OF THE INVENTION

My present invention relates to a separator for collecting solid particles from a gas stream by centrifugal force and to an assembly of such separators in a plant for a transfer of heat and/or matter in a plurality of stages.

BACKGROUND OF THE INVENTION

Swiss Patent Specification No. 411,536 discloses a centrifugal particle/gas separator in which the gas stream descends along a helical path in an annular separating zone and then rises inside the separating zone. That separator has a gas supply line which extends in the upper region from the inside into an annular separating zone and has at least one flow passage for the gas stream adjacent to the discharge zone.

The gas stream enters vertically from below and is then deflected outwardly initially in a horizontal radial direction, then in a tangential direction, then downwardly along a helical path, and then inwardly and finally upwardly. In addition, the gas stream appears to be divided into a plurality of partial streams so that the conditions for the separation are radially symmetrical.

The conducting of the gas along this extensive flow path involves a considerable drag and does not permit a satisfactory solids recovery factor to be achieved because the gas flows downwardly in a direction that is parallel to the movement of the subsiding solid particles so that particles which have already been separated may be re-entrained and discharged from the separator.

OBJECTS OF THE INVENTION

It is an object of the present invention to provide a centrifugal separator in which the drag is distinctly decreased whereas the solids recovery factor is not adversely affected.

Another object is to improve the separation efficiency of such a separator.

SUMMARY OF THE INVENTION

These objects and others which will become apparent hereinafter are attained in a centrifugal separator in which the gas supply line is closed at its upper end and merges into a duct whereby a vertically rising gas stream is deflected into a substantially horizontal direction that is tangential to the gas supply line.

In this description the solids recovery factor is defined as the ratio of solids supplied to the separator to solids collected in the separator in percent by weight, and the solids recovery rate is defined as the rate at which solids are collected in the separator.

More specifically, according to the invention the separator for collecting solid particles from a gas stream by centrifugal force comprises a vertical cylindrical housing having a coaxial upper gas discharge pipe, a lower gas supply line extending coaxially into the housing, and a solids outlet which is laterally disposed in a lower portion of the housing, the gas supply line being closed at its upper end and merging into at least one duct by which the vertically rising gas stream is deflected into a substantially horizontal direction tangential to the gas supply line. The duct comprises a vertical spiral-shaped cylindrical wall portion and increases in radius in the direction of flow, and upper and lower covers disposed between the wall portion and the gas supply line, the wall of the gas supply line being removed entirely or in part in a region opposite the wall portion; this wall portion can extend over an angle of 150° to 300° from the beginning of the radially enlarged portion. Most advantageously, however, the wall portion extends over an angle of 150° to 180°.

The wall portion can be formed by the wall of the gas supply line which is cut away and swung outwardly and welded to the covers. Specifically, the wall portion can extend over an angle of 180° to 270° and the wall of the gas supply line can be removed over an angle of 150° to 180° from the beginning of the radially enlarged portion. Each of the lower and upper horizontal covers can extend throughout the length of the wall portion or the lower cover can terminate short of the end of the wall portion. In the latter case the lower cover extends over an angle of 150° to 180° from the beginning of the radially enlarged portion. Advantageously, the flow area of the cylindrical housing is three to seven times the flow area of the gas supply line and the exit flow area of the duct is 0.6 to 1.2 times the flow area of the gas supply line.

The cylindrical housing can be connected to the upper gas discharge opening by a conically tapering discharge pipe and the housing closed at its bottom by an inclined planar wall. The top closure of the gas supply line is roof-shaped; in the upper end portion of the gas supply line a deflecting wall is advantageously provided.

Alternatively, two ducts can be provided, which are then offset by 180°.

The separator of the invention is preferably used in a plant for a transfer of heat and/or matter between a gas stream and a stream of solid particles in a plurality of stages. In this case a plurality of separators are arranged one over the other in cascade, the gas discharge pipe of each lower separator coaxially merges into the gas supply line of the next upper separator, an inlet for supplying solid particles into the gas stream is disposed below the uppermost separator and connected to the gas supply line thereof, the solids outlet of each upper separator is connected to the solids inlet of the next lower separator, the gas stream is withdrawn from the uppermost separator and optionally supplied to additional separating means, and the stream of solid particles is withdrawn from the plant from the lowermost separator.

The drag in the separator of the invention is at least 15% lower than in conventional separators of this kind. This will be particularly advantageous when the separators are used in a plant for a transfer of heat and/or matter in a plurality of stages. Owing to the compact structure and to the improved separation in the lower stages, the dissipation of radiant heat can be reduced by at least 10% and the capital cost can be reduced by 10 to 20%. In dependence on the structural design, the solids recovery factor amounts to 85 to 95% and more. The separator in accordance with the invention affords also the advantage that it is very simple in structure, has no complicated components and does not necessarily require the gas stream to be divided. Only if the gas rates are very high so that the gas supply line is correspondingly large in cross-section may it be desirable to provide two ducts for the gas to be discharged. The flow of gas along a single path affords advantages in manufacture and in operation and permits deposits of solid particles and the wear of the separator to be minimized.

BRIEF DESCRIPTION OF THE DRAWING

The above and other objects, features and advantages of the present invention will become more readily apparent from the following description, reference being made to the accompanying drawing in which.

Figure 1:
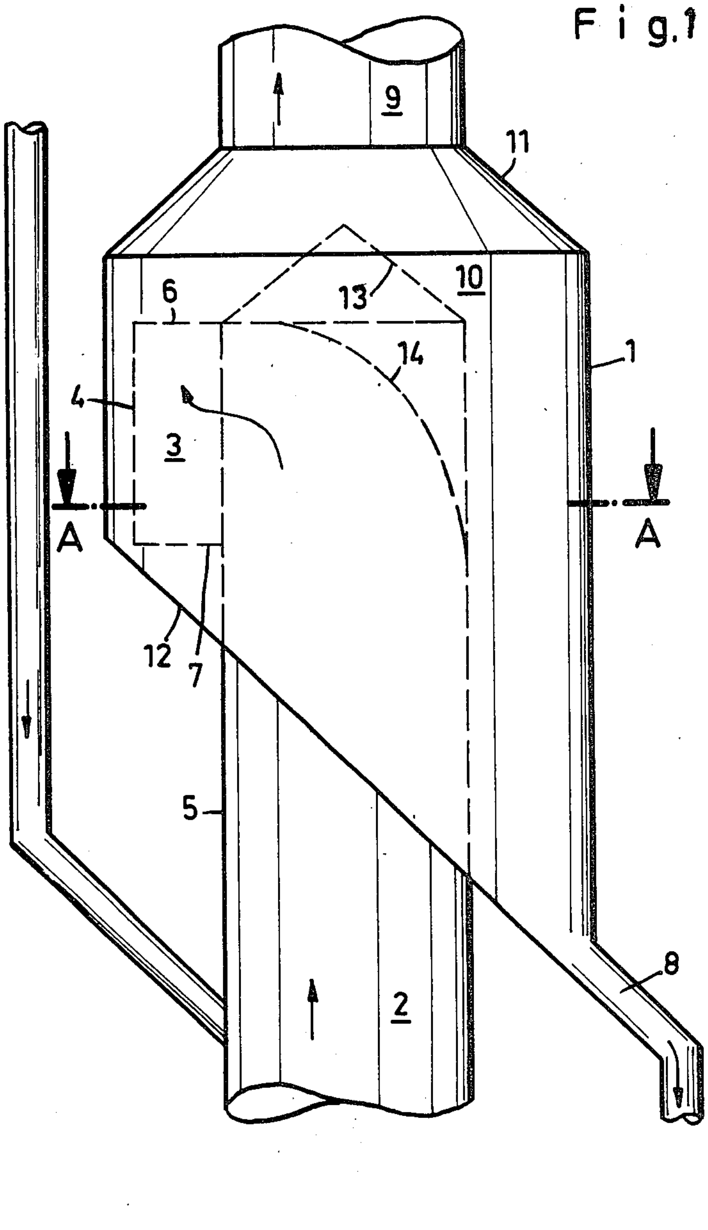
FIG. 1 is a highly simplified side-elevational view showing the basic design of the separator.
Figure 3:
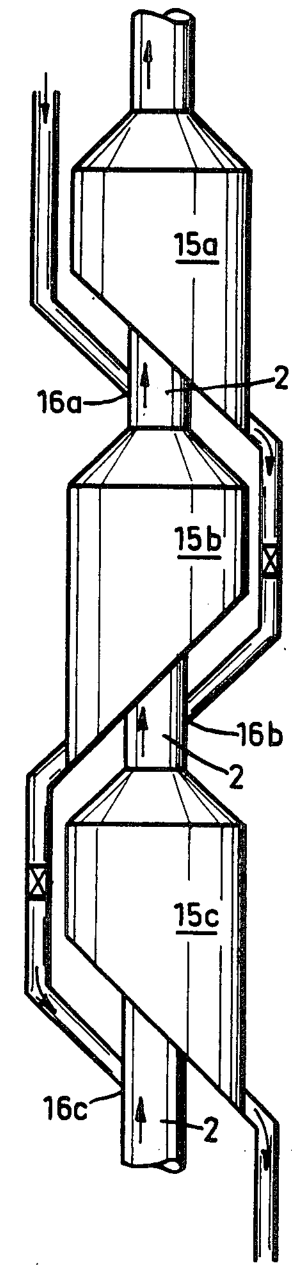
Figure 5:
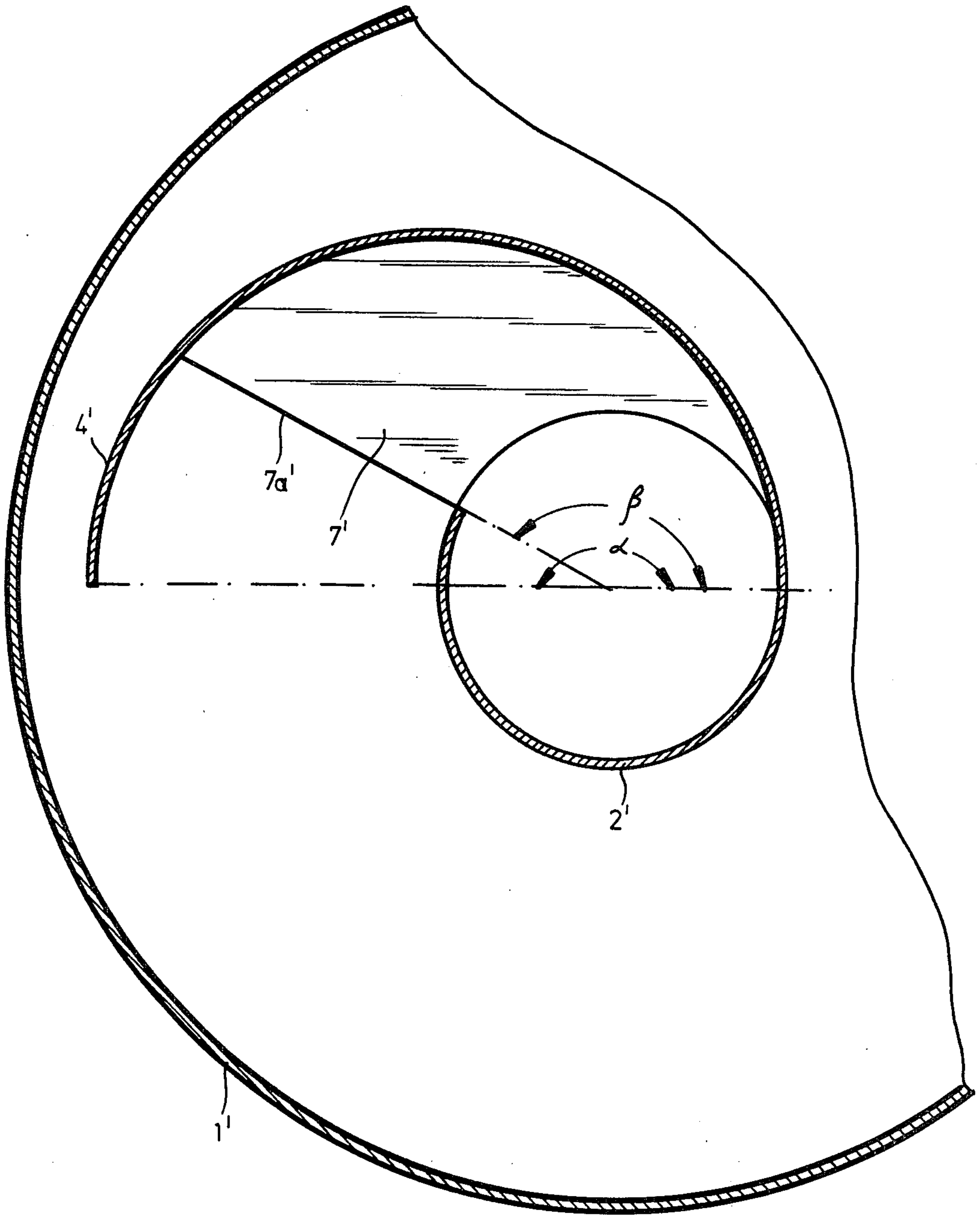
Figure 7:
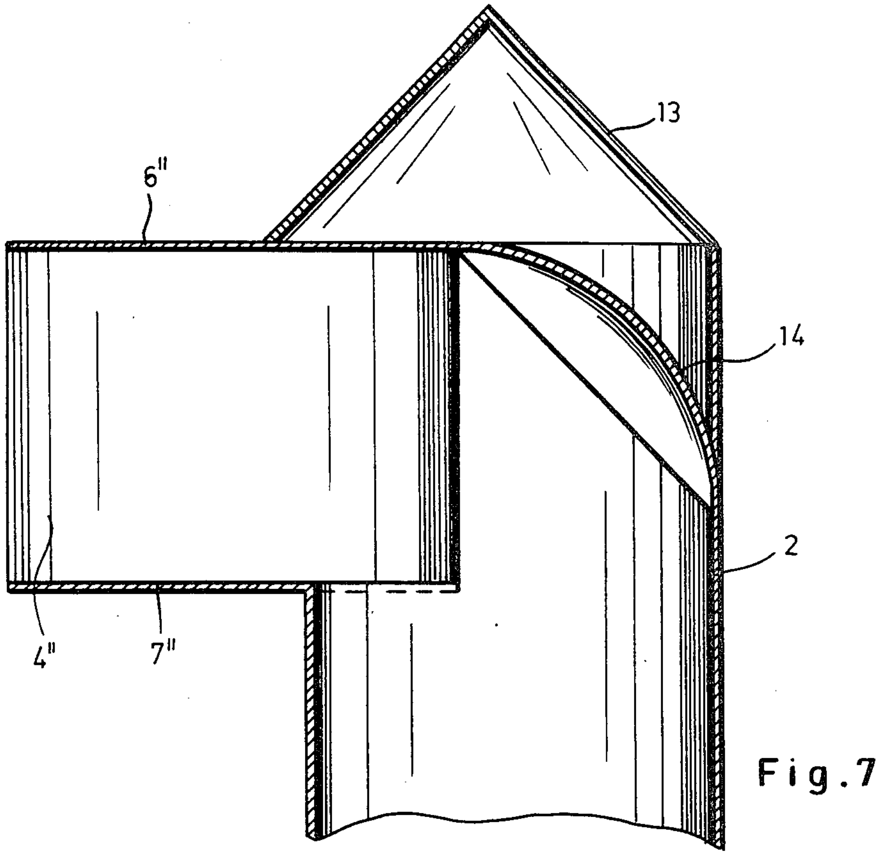
Figure 6:
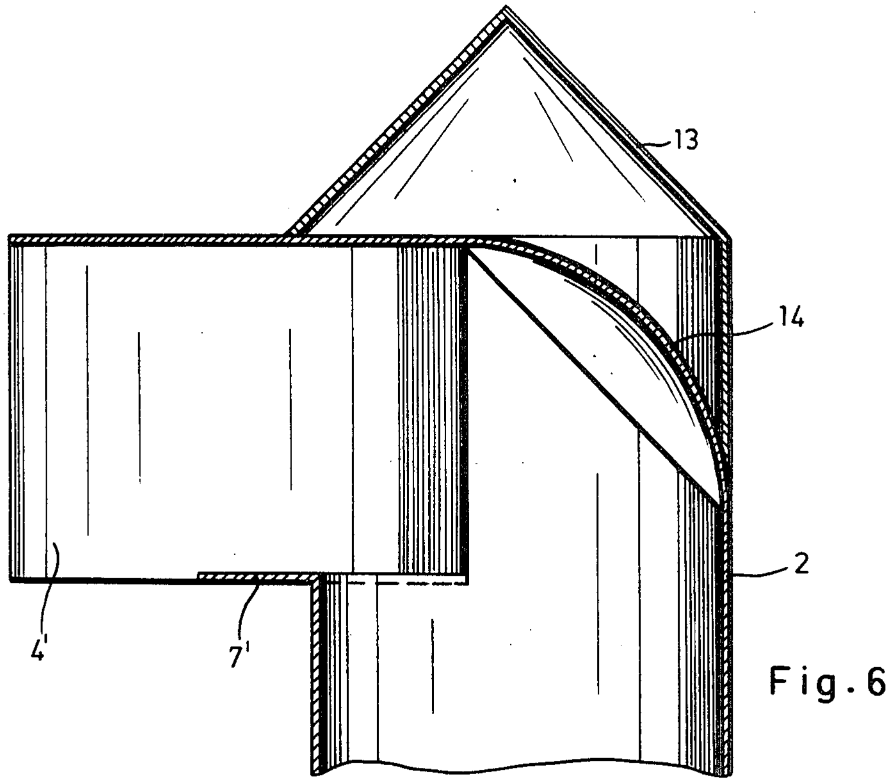

FIGS. *2a* and *2b* are sectional views taken along line A—A in FIG. 1 and along line B—B in FIG. *2a*, respectively;

FIG. 3 shows a plant with three superimposed separators according to the invention;

FIGS. *4a* and *4b* are highly simplified views showing the basic design of the separator having two ducts;

FIG. 5 is a detailed section perpendicular to the axis of the duct;

FIG. 6 is an axial section thereof;

FIG. 7 is an axial section of another embodiment; and

Figure 8:
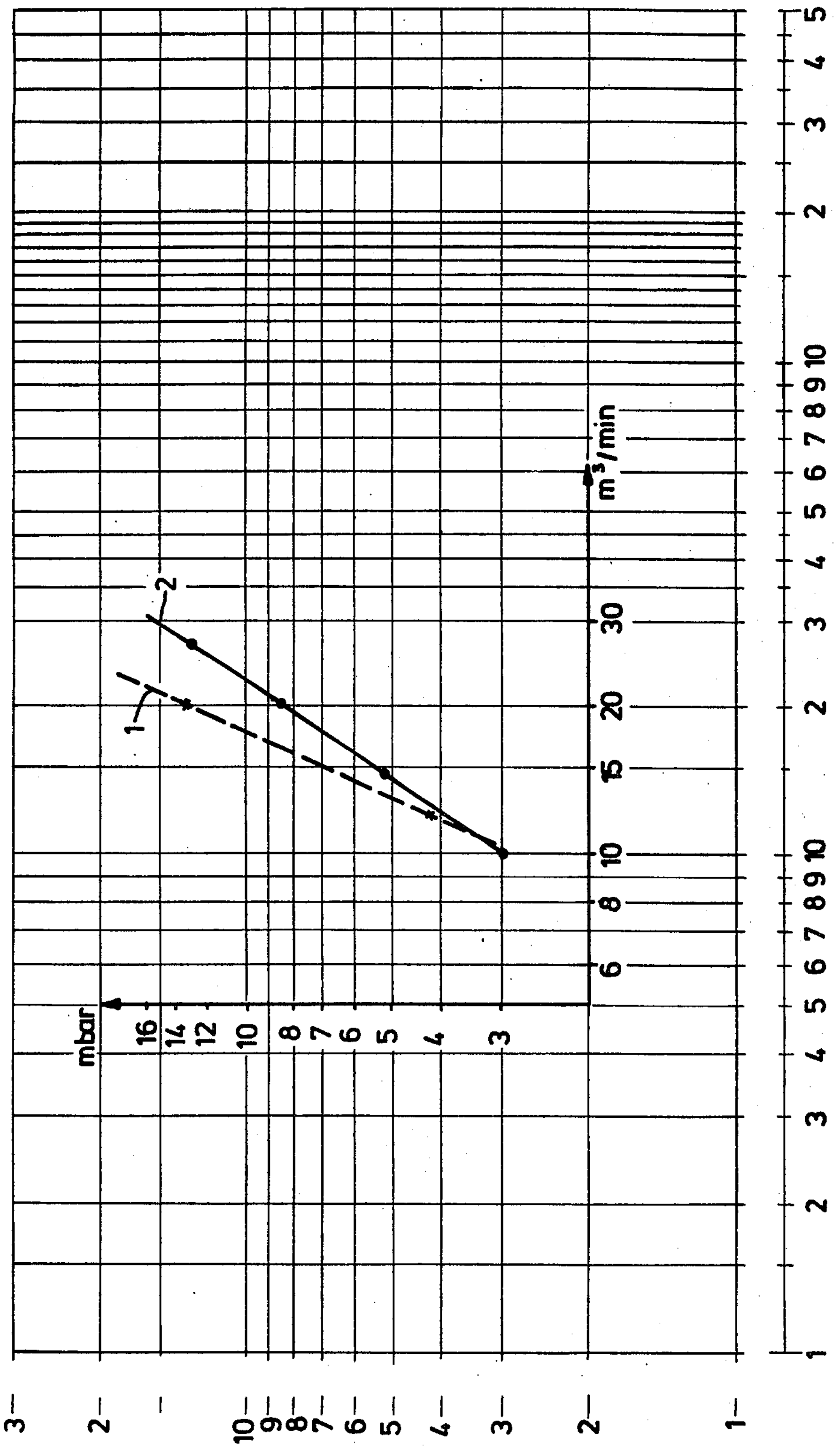

FIG. 8 is a graph illustrative of the embodiment of FIGS. 5 and 6.

SPECIFIC DESCRIPTION

The separator shown in FIG. 1 comprises an upright cylindrical housing 1, into which the gas supply line 2 protrudes from below. The gas discharge pipe 9 extends from the top of the housing.

The gas supply line 2 is closed at its top end and in that region merges into a duct 3, by which the vertically rising gas stream is deflected into a horizontal direction which is tangential to the gas supply line 2, as is indicated by arrows.

For this purpose, the duct 3 comprises a vertical cylindrical wall portion 4 or deflector means, which is spiral-shaped and increases in radius in the direction of flow, and by upper and lower horizontal covers 6 and 7, respectively, between the wall portion 4 and the gas supply line 2. Opposite the wall portion 4 the wall 5 of the gas supply line 2 has been removed entirely or in part. From the beginning of the radially enlarged portion the wall portion 4 may extend over an angle of 150 to 300 degrees and will usually extend over an angle of 150 to 180 degrees. A particularly simple design of the duct 3 may be adopted if the wall portion 4 is formed by the wall 5 of the gas supply line. The separated solid particles are discharged from the separator through a line 8.

In dependence on the application, the design of the duct 3 may be selected to provide a separator in accordance with the invention which has an optimum performance as regards a minimum drag or a maximum solids recovery factor. The solids recovery factor will be improved if the wall portion 4 extends over an angle of 180 to 270 degrees and the wall 5 of the gas supply line 2 has been removed only over an angle of 150 to 180 degrees from the beginning of the radially enlarged portion. The operating characteristics of the separator in accordance with the invention can also be influenced in that the lower and upper horizontal covers extend either throughout the length of the wall portion 4 or the lower cover extends only through part of the length of the wall portion 4, e.g. over an angle of 150 to 180 degrees. The flow area of the cylindrical housing 1 is suitably three to seven times the flow area of the gas supply line 2. The exit flow area of the duct 3 should be 0.6 to 1.2 times the flow area of the gas supply line.

In FIGS. 5 and 6, for example, the lower cover 7′ ends at an edge **7*a*′ removed by the angle $\beta$ of, say, 150° from the start of the wall portion 4′ of the gas supply line 2′ while the wall portion 4′ extends over 180° in the housing 1′**.

In FIG. 7 the covers 6″ and 7″ extend over the entire length of wall portion 4″.

The cylindrical housing 1 and the upper gas discharge opening 10 are suitably connected by a conically tapering discharge pipe 11. The lower end of the housing 1 may be constituted by an inclined planar wall 12. The angle of incidence on this wall will be selected in dependence on the flow behavior of the solid particles that are entrained. To avoid accumulations of solids, the closed top 13 of the gas supply line 2 should be roof-shaped. A deflecting wall 14 is suitably provided in the upper end portion of the gas supply line 2 so that drag caused by turbulence will be avoided.

Owing to the design of the duct 3 the gas stream is given the swirl which is required to separate the entrained solid particles by centrifugal force in the housing 1 in an outward direction toward the wall so that they can subsequently subside by gravity whereas the gas stream rises first along a helical path and then along a spiral-shaped tapering path and leaves the housing through the gas discharge opening 10. An important feature resides in that, owing to the design of the duct 3, no downward vertical component of motion is imparted to the gas stream so that the extent to which the flow is deflected will be absolutely minimized and there is no risk of an entraining of previously separated solid particles. The gas flow path which has been described ensures the desired high solids recovery factor in conjunction with a minimum drag.

It is apparent from FIGS. *2a* and *2b* how the duct 3 is substantially formed by the spirally flaring wall portion 4.

Such separators are usually tested in so-called no-load tests at different gas flow rates with gases in which no solids are entrained. In such tests it has been found that, in a separator in accordance with the invention, the pressure drop is up to 40% lower than in conventional separators. Experience has shown that improvements of the same order of magnitude are achieved also in practice. It is understood that it has always been endeavored in so-called centrifugal separators (or cyclones) to obtain a given solids recovery factor in conjunction with a minimum pressure drop. Yet for a long time it has not been possible to achieve appreciable improvements in a manner that was economically satisfactory. It was not possible to predict that an appreciable decrease of the drag without a decrease of the solids recovery factor could be achieved with the separator in accordance with the invention which is simpler in structure and involves lower manufacturing costs.

FIG. 3 shows diagrammatically the use of three separators in accordance with the invention in a plant for a transfer of heat and/or matter between a gas stream and a stream of solid particles in a plurality of stages. The gas discharge pipe of each lower separator **15*b* or 15*c* merges into the gas supply line of the next upper separator 15*a* or 15*b*. An inlet 16*a*, 16*b* or 16*c* is provided below each separator 15*a*, 15*b* or 15*c* and serves to supply the solid particles to the gas supply line 2. The solid particles are supplied to the gas stream through the uppermost inlet 16*a* for the first time. Each of the inlets 16*b* and 16*c* is connected by a pipeline to the solids outlet of the next upper separator 15*a* or 15*b*. The gas stream from which substantially all solid particles have been removed is discharged from the plant through the gas discharge pipe of the uppermost separator 15***a*. The stream of solid particles is discharged from the solids outlet of the lowermost separator 15*c*.

Figure 2A:
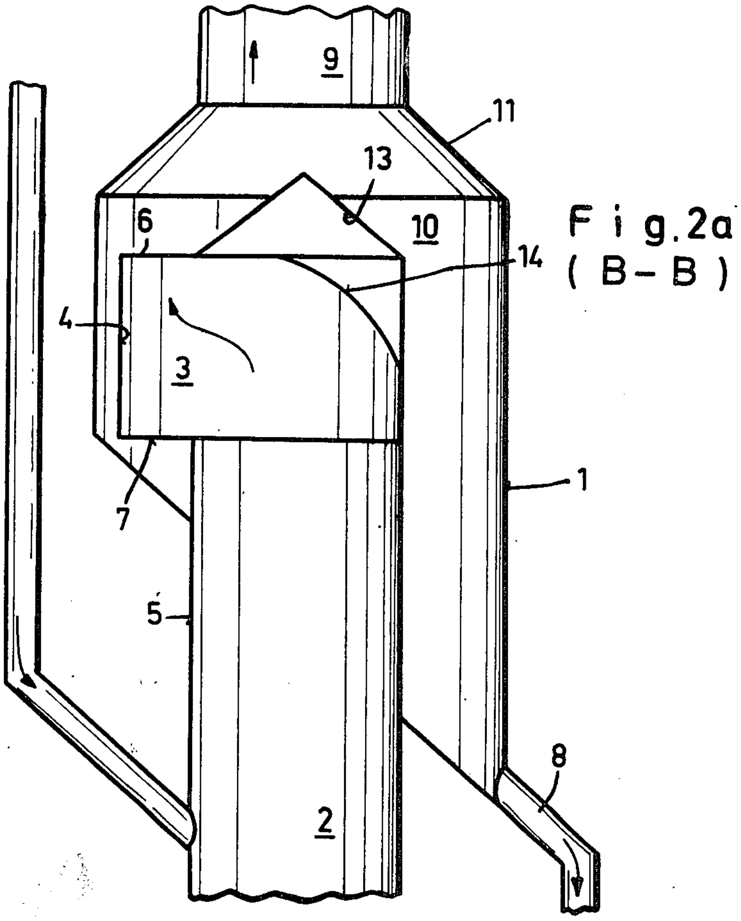
Figure 2B:
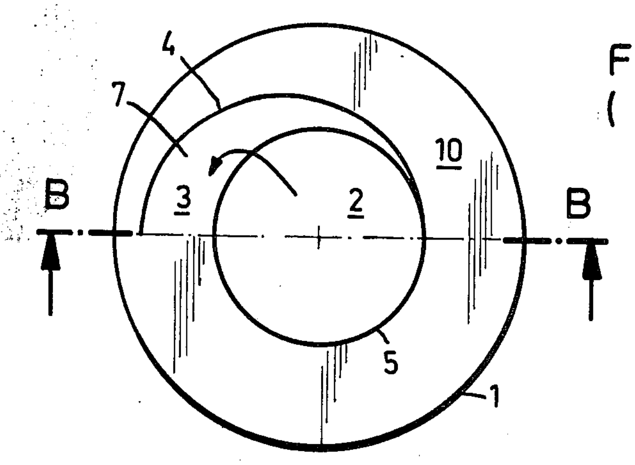
Figure 4B:
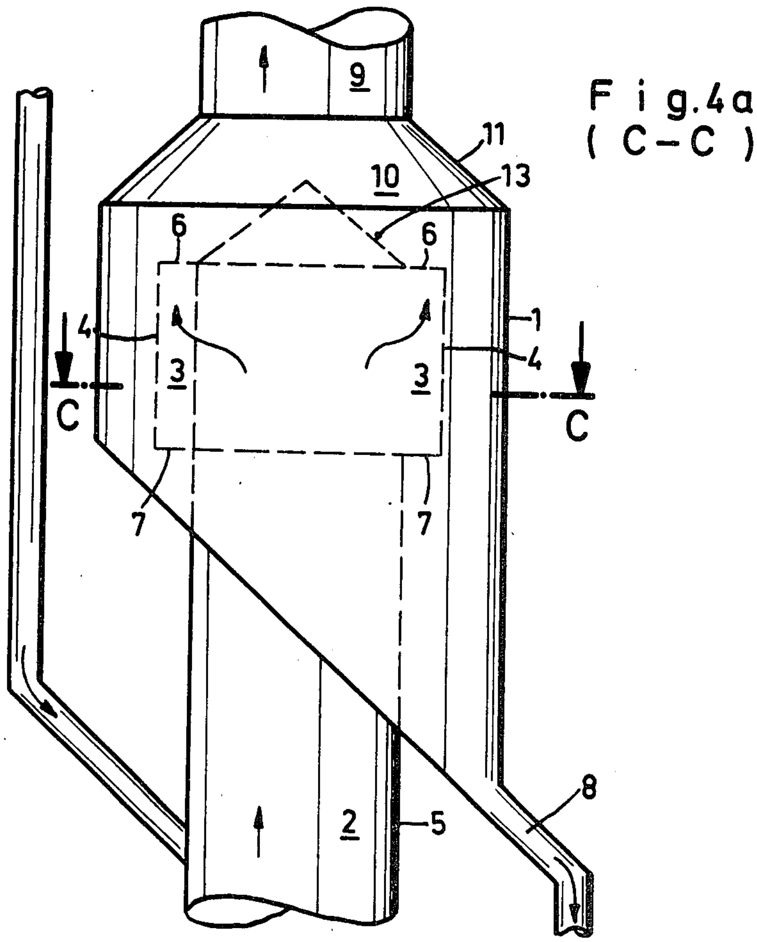
Figure 4B:
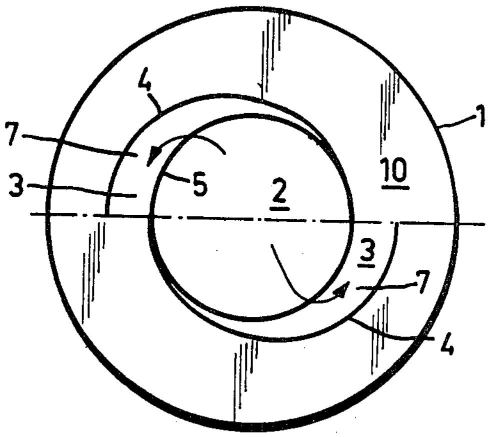

FIGS. 4*a* and 4*b* show a separator comprising two ducts 3, which are spaced 180 degrees apart. In other respects the design of the embodiment shown in FIGS. 4*a* and 4*b* and the reference characters therein are the same as in FIGS. 2*a* and 2*b*. This embodiment will be adopted only if very high gas flow rates require a separator which is large in diameter.

The advantages afforded by the separator in accordance with the invention are clearly apparent also from the diagram of FIG. 8, in which the pressure drop is plotted against the gas flow rate for a conventional cyclone having a tangential gas inlet at its top and a depending pipe (curve 1 of FIG. 8) and for a separator in accordance with the invention (curve 2 of FIG. 8).

The housings of both separators that were compared had an inside diameter of 0.45 meter and a flow area $F_1$ of 0.159 $m^2$. It is generally assumed that about 75% of the pressure drop of conventional cyclones is due to the depending pipe, 10% is due to the inlet region and the balance is due to wall friction and other sources of loss. The separator in accordance with the invention differs greatly in design and an estimate of the distribution of the pressure drop is not yet available. In the separator used for the measurements the gas supply line had an inside diameter of 0.20 meter and a flow area $F_2$ of 0.0314 $m^2$ so that the ratio of $F_1$:$F_2$ was slightly above 5.

From the beginning of the spiral-shaped enlarged portion the duct extended over an angle of 200°. The upper and lower covers of the duct extended throughout that angular range. The wall of the gas supply line had been removed over an angle of 155° so that the duct was closed throughout its periphery over an angle of $200°-155°=45°$ and had approximately the same flow area as the gas supply line.

The experiments were conducted with a loading of 0.9 to 1 kg of a ground raw material mixture for making hydraulic cement per kilogram of gas throughout and with the throughput volumes which are apparent from the diagram.

In the log-log diagram, the data for the conventional cyclone lie on a straight line 1, which is much steeper than the straight line 2 representing the data for the separator in accordance with the invention. For the lower throughput rates, which are not interesting for the separator of the selected sizes, the curve 1 represents slightly lower pressure losses. But it is known that the solids recovery factor is distinctly lower in that throughput rate range, which is very remote from the design throughput rate and for this reason that range need not be taken into account in the comparison. The recommended throughput rate of both separators lies in the range from about 13 to 16 $m^3$/minute, in which curve 2 rises much less steeply and indicates much lower pressure drops than curve 1 as the throughput rate increases. It is remarkable that the solids recovery factor obtained in that range with the selected embodiment amounted to at least 95% and in the upper part of the range increased almost to 99%. Approximately the same high solids recovery factors are achieved with the conventional cyclone so that the curves of that diagram are applicable to virtually the same solids recovery rates.

The diagram shows that, e.g. at a throughput of 20 $m^3$/minute the pressure drop is distinctly lower (8.5 millibars rather than 13.5 millibars) and that at a given pressure loss of, e.g. 13 millibars, the separator in accordance with the invention can be operated with a throughput rate of 26 $m^3$/minute rather than 20 $m^3$/minute, which means an increase of about 30%. Conversely, this means that the overall dimensions required for a given throughput rate may be smaller than those of the known cyclones. This fact will be particularly significant in larger plants in which the known upper limit to the housing diameter of cyclones necessitates the use of two-channel separators. The upper limit to the throughput rate imposed in view of that aspect is at least 30% higher for the separator in accordance with the invention. It will be understood that this results in substantial savings as regards capital costs. It is apparent that the separator in accordance with the invention affords appreciable advantages over conventional cyclones as relates to operating and capital costs.

I claim:

1. A particle/gas separator comprising:

a vertical cylindrical housing centered on an axis and having an upper end and a lower end and a circumferentially closed wall therebetween;

a single axial duct forming a gas outlet opening axially downward in the upper end of said housing;

means including a bottom wall generally closing the lower end of said housing and a solids-discharge outlet for removing solids from the lower end of the housing;

a cylindrical gas-supply line rising vertically through said bottom wall along the axis into the lower end of said housing coaxial therewith and upwardly terminating below said duct, the line being formed in the housing below the duct with a radial opening;

a wall portion extending horizontally, tangentially, and as a spiral with an increasing radius of curvature in a direction of flow from the line at an edge of the opening and having upper and lower edges, the wall portion extending relative to the axis over an arc of 150° to 180° and being at least partially formed as a cutaway of the wall of the line;

upper and lower covers extending radially inward from the respective edges of the wall portion to the line respectively above and below the opening and forming therewith a radial-to-tangential deflector, the circumferentially closed wall of the housing surrounding said line, the wall portion, and the covers with annular clearance to define with said line, said wall portion, and said covers an annular free space opening axially upward into said duct all around said line;

deflector means in the gas-supply line at the opening for guiding a vertically rising gas stream in the line into a radially outward outflow through the opening into said radial-to-tangential deflector means and thence tangentially from the radial-to-tangential deflector into said clearance; and a closure upwardly closing the gas-supply line above the radial opening.

2. The separator defined in claim 1 wherein said covers extend over the entire length of said wall portion.

3. The separator defined in claim 1 wherein said lower cover terminates short of the free end of said wall portion.

4. The separator defined in claim 3 wherein said lower cover extends over an angle of 150° to 180° from the beginning of said wall portion adjacent the circumference of said line.

5. The separator defined in claim 1 wherein the flow cross section of said housing is 3 to 7 times the flow cross section of said gas-supply line.

6. The separator defined in claim 1 wherein the cutaway region of said wall of said line forms a flow cross section which is 0.6 to 1.2 times the flow cross section of said gas-supply line.

7. The separator defined in claim 1 wherein said duct communicates with the upper end of said housing via a frustoconical convergent portion thereof.

8. The separator defined in claim 1 wherein the bottom wall slopes downward toward said outlet.

9. The separator defined in claim 1 wherein said closure is roof-shaped.

10. The separator defined in claim 1 wherein two such wall portions respective closures are provided at diametrically opposite sides of said line.

11. A gas/solids separating plant comprising a cascade of separators as defined in claim 1 disposed one above another, the duct of each lower separator forming a gas-supply line of each next upper separator, the outlet of each separator communicating with the gas-inlet line opening into the next lower separator.

* * * * *